(12) United States Patent
Sugihara

(10) Patent No.: US 7,364,612 B2
(45) Date of Patent: Apr. 29, 2008

(54) PRINTING INK, AND DECORATED SHEET OBTAINED USING THE SAME

(75) Inventor: Takeshi Sugihara, Tokyo (JP)

(73) Assignee: Teikoku Printing Inks Mfg. Co., Ltd., Tokyo (JP)

( * ) Notice: Subject to any disclaimer, the term of this patent is extended or adjusted under 35 U.S.C. 154(b) by 520 days.

(21) Appl. No.: 10/868,849

(22) Filed: Jun. 17, 2004

(65) Prior Publication Data

US 2004/0266910 A1    Dec. 30, 2004

(30) Foreign Application Priority Data

Jun. 30, 2003  (JP) .............................. 2003-187449
Jul. 24, 2003   (JP) .............................. 2003-279417

(51) Int. Cl.
*C09D 11/00* (2006.01)
*C09D 11/02* (2006.01)
*C09D 11/10* (2006.01)
*C04B 41/45* (2006.01)

(52) U.S. Cl. ................ 106/31.31; 106/31.27; 106/31.28; 106/31.66; 106/38.2; 106/38.22; 264/132

(58) Field of Classification Search ............... 523/160, 523/161; 106/38.2, 38.22, 38.35; 264/132; 524/611, 282, 295
See application file for complete search history.

(56) References Cited

U.S. PATENT DOCUMENTS

| | | | |
|---|---|---|---|
| 3,186,961 A * | 6/1965 | Sears ..................... | 524/114 |
| 3,965,064 A * | 6/1976 | Mercier et al. ............ | 524/145 |
| 5,648,414 A * | 7/1997 | Bier et al. ................. | 524/323 |
| 6,180,251 B1 * | 1/2001 | Kanai et al. ............... | 428/457 |
| 6,485,873 B1 * | 11/2002 | Ohkura et al. ............. | 430/83 |
| 6,608,165 B2 * | 8/2003 | Funakoshi et al. ......... | 528/196 |
| 6,958,189 B2 * | 10/2005 | Weiss et al. ............... | 428/412 |
| 2001/0041249 A1 * | 11/2001 | Sekine ..................... | 428/208 |

FOREIGN PATENT DOCUMENTS

| | | |
|---|---|---|
| DE | 198 32 570 A | 2/2000 |
| EP | 0 688 839 | 12/1995 |
| JP | 10316918 A * | 12/1998 |
| JP | 2997636 B | 10/1999 |
| JP | 2001-019885 A | 1/2001 |
| JP | 2001-294793 A | 10/2001 |
| JP | 2001-342398 A | 12/2001 |

OTHER PUBLICATIONS

Machine Translation 10-316918 A (1998).*

* cited by examiner

*Primary Examiner*—Sanza L. McClendon
(74) *Attorney, Agent, or Firm*—Westerman, Hattori, Daniels & Adrian, LLP.

(57) ABSTRACT

The invention provides a printing ink for printing on a decorated sheet for application to integral molding of synthetic resin, which is less capable of curling the decorated sheet and less susceptible to run during molding. The printing ink comprises a compound having the following formula (1) or (2) together with a polycarbonate resin binder and a solvent for the same 9 Claims, 2 Drawing Sheets

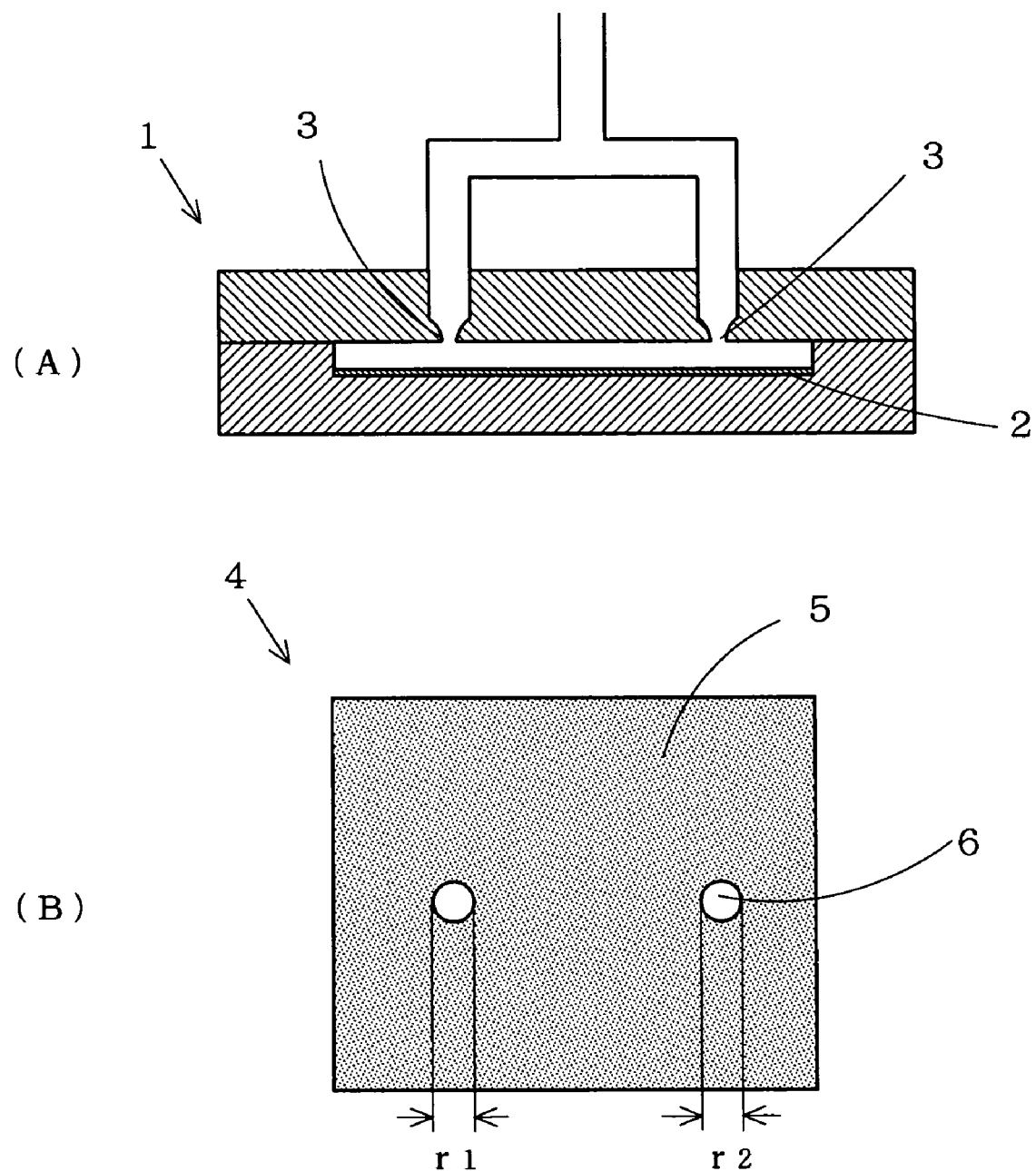

PRINTING INK, AND DECORATED SHEET OBTAINED USING THE SAME

BACKGROUND OF THE INVENTION

The present invention relates to a printing ink, a sheet decorated by that ink, and a synthetic resin molded article obtained by injection molding or other integral molding using that decorated sheet.

Among processes so far known to apply decorations onto the surface of a synthetic resin molded article, there is a synthetic resin molding process (hereinafter often referred to as a film insert molding process) wherein a thermoplastic resin printing material such as a thermoplastic resin film or sheet that has previously been printed by ink (hereinafter often referred to as a decorated sheet) is loaded in a mold, and a synthetic resin is then injected into the mold for integration with the decorated sheet.

This process has one feature of being capable of applying decorations even on a molded article that encounters difficulty in application of direct coloration, patterning, etc. by printing onto its surface. Another merit is that a printed layer formed on the decorated sheet can be retained between the synthetic resin molded article and a substrate film or sheet of the decorated sheet in close contact relations; much better scratch resistance is achievable as compared with printing processes for the surfaces of molded articles, and the resulting decorated article is less likely to change with years. Thus, this process is used for application of decorations onto the surfaces of various equipments inclusive of small-format electronic gadgetry such as cellular phones and PCs.

A problem with the film insert molding process is, however, that the molding synthetic resin fluidized by heating is injected at high pressure into the mold after the decorated sheet has been placed in the mold. Especially when the synthetic resin to be injected is a heat-resistant synthetic resin such as a polycarbonate resin, it is injected upon fluidization at a high temperature of 200 to 300° C. This leads to another problem that the ink printed on the decorated sheet runs out due to fluidization.

To eliminate such problems, a heat-resistant printing ink with a polycarbonate resin contained as a binder therein is used for printing of decorated sheets (see, for instance, JP2997636, JP(A)200119885, JP(A)2001294793 and JP(A) 2001342398).

Even when this printing ink is used, however, an ink running problem still arises in environments in which severe injection molding conditions such as high injection rates of synthetic resins upon molding and the proximity of an injection gate to printed portions of decorated sheets are applied.

In addition, when a thin polycarbonate film or sheet is used with a decorated sheet printed by that ink, and especially when a substrate of as thin as about 125 μm is used, a printed portion is distorted or a printed surface side is largely curled. Consequently, in the case of multicolor printing, the second and subsequent colors will be printed on a distorted substrate, resulting in color misalignment and making it impossible to obtain any precisely prints. Further, in expectation of a possible curled distortion, a substrate larger than a printed area should be so provided that the printed area can be formed at only a portion of the substrate in such a way as to be not affected by the curled distortion. This offers a problem that substrate material is squandered away and workability becomes worse.

An ink that is less likely to give rise to distortion even when drying is carried out after it has been printed on a thin polycarbonate resin substrate is proposed, as set forth in JP(A)2001342398. However, there is a problem that a great deal of ink runs out during molding, although depending on where an injection gate is located at a mold.

The present invention has for its object the provision of an ink used for making a decorated sheet that is loaded in a mold upon molding for integration with a synthetic resin, which is less likely to distort or curl a thin substrate when printed thereon and dried, so that the printed ink is less likely to run out due to an injected polycarbonate resin flow and, hence, a gate can be located nearer to a printed surface of the decorated sheet.

Another object of the present invention is to provide an ink that, upon printed, has a greater adhesion force to a molded synthetic resin and enables a molded article of improved durability to be formed regardless of configuration.

BRIEF DESCRIPTION OF THE DRAWINGS

FIGS. 2(A) and 2(B) are illustrative of a mold and film insert molded samples used for estimating the inventive examples.

SUMMARY OF THE INVENTION

Figure 1:
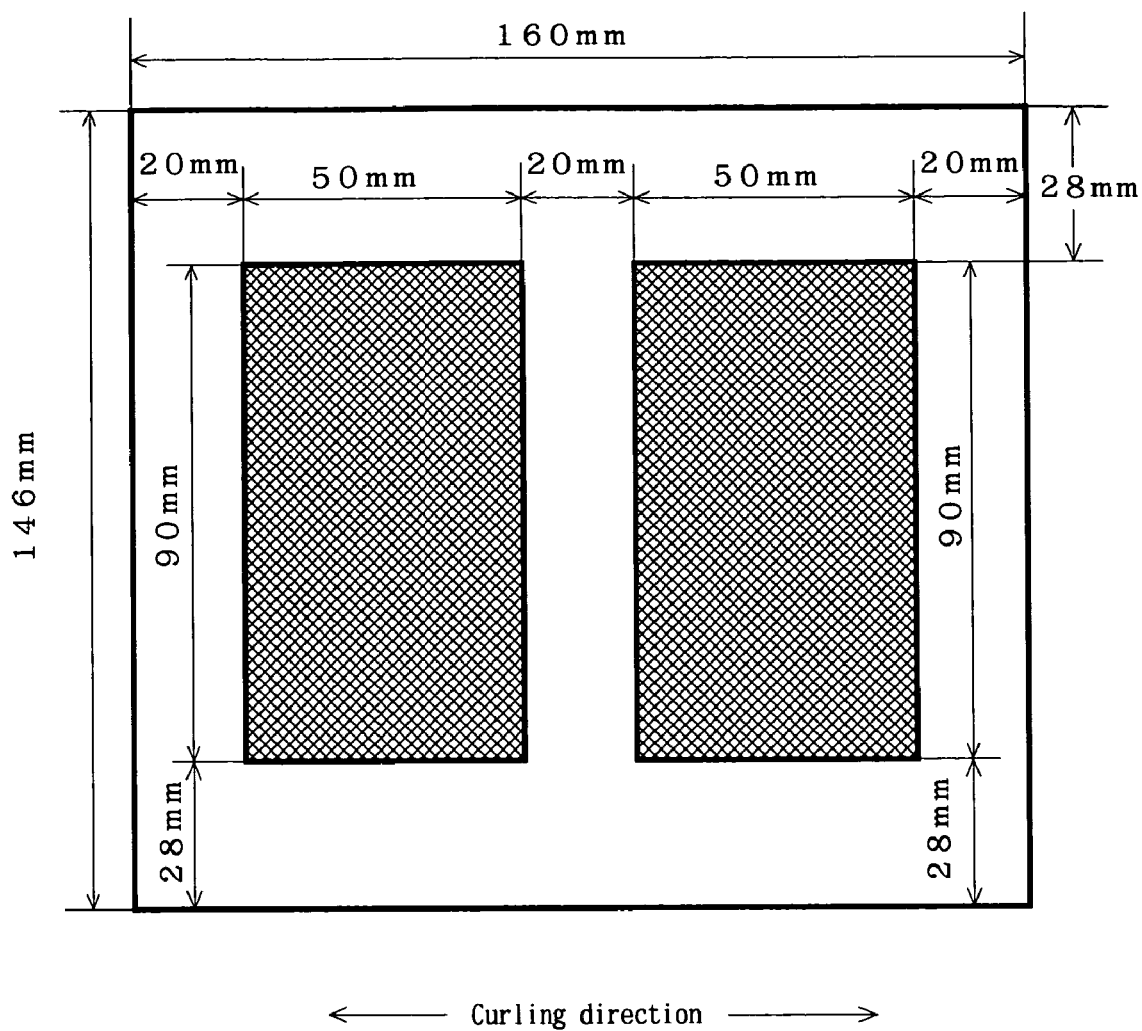
FIG. 1 is illustrative of a decorated sheet used for measuring the amount of curling.

The present invention provides a heat-resistant printing ink that comprises a compound having the following formula (1) or (2) together with a polycarbonate resin binder and a solvent therefor.

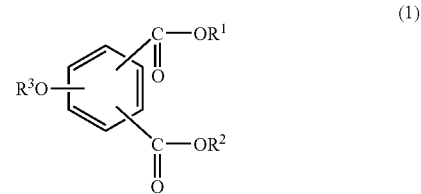

(1)

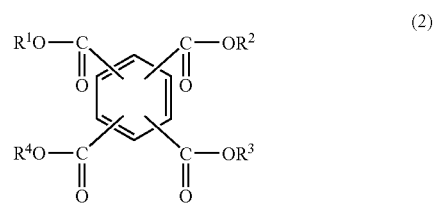

(2)

Here $R^1$, $R^2$, $R^3$ and $R^4$ may be identical with or different from one another, each representing a hydrocarbon residue.

Preferably, the hydrocarbon residue is an alkyl group having 4 to 12 carbon atoms.

Preferably, the polycarbonate resin is a thermoplastic aromatic polycarbonate including a difunctional polycarbonate structure unit, represented by the following formula (3):

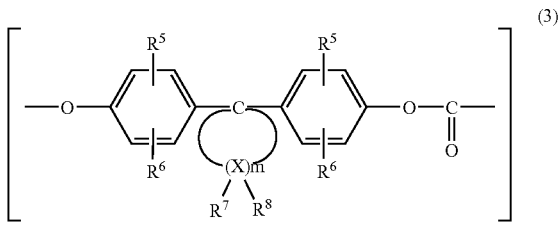

(3)

Here $R^5$ and $R^6$ are each independently a hydrogen atom, a halogen atom, an alkyl having 1 to 8 carbon atoms, a cycloalkyl having 5 or 6 carbon atoms or an arylalkyl having 6 to 10 carbon atoms, m is an integer of 4 to 7, $R^7$ and $R^8$ may be selected for each X and are each independently a hydrogen atom or an alkyl group having 1 to 6 carbon atoms, and X is a carbon atom, with the proviso that when X is at least one atom, $R^7$ and $R^8$ are each an alkyl group.

Preferably, the polycarbonate resin is a thermoplastic aromatic polycarbonate including a difunctional polycarbonate structure unit, represented by the following formula (4).

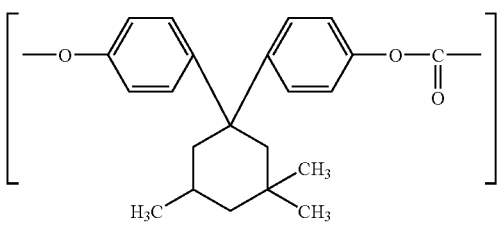

(4)

The present invention also provides an ink-decorated sheet, wherein a thermoplastic resin film or sheet has on at least one surface at least one printed layer that is formed using the ink of the invention as defined above.

Further, the present invention provides a synthetic resin-molded article, wherein a thermoplastic synthetic resin is molded integrally with the thermoplastic resin decorated sheet as defined above.

Preferably, the synthetic resin molded article is formed by film insert molding.

DESCRIPTION OF THE PREFERRED EMBODIMENTS

The present invention provides a decorated sheet wherein a given colored or patterned layer is printed, as desired, on a thermoplastic synthetic resin substrate comprising a film or sheet made of a polycarbonate or other resin, using a printing ink comprising a mixture of a polycarbonate resin binder and a solvent with a specific aromatic polybasic carboxylic acid ester. According to the invention, it has now been found that after printing, the ensuing images are not susceptible to distortion or curling. It has also been found that when that decorated sheet is molded integrally with a synthetic resin in a mold, the ink can be prevented from running out of a printed surface of the decorated sheet even with an inlet gate for pouring a fluidized synthetic resin into the mold located relatively near to the printed surface of the decorated sheet, and in the resultant molded article, a printed layer is more firmly joined to the synthetic resin.

Specifically, the printing ink of the invention is obtained by mixing a polycarbonate resin and a solvent therefor with a specific aromatic polybasic acid ester having the following formula (1) or (2).

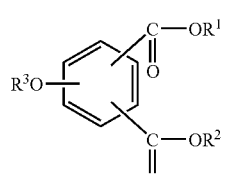

(1)

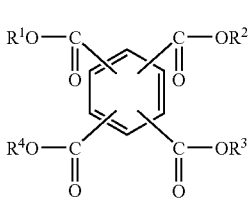

(2)

Here $R^1$, $R^2$, $R^3$ and $R^4$ may be identical with or different form one another, each representing a hydrocarbon residue.

In formula (1) or (2), it is preferable that each of $R^1$, $R^2$, $R^3$ and $R^4$ is an alkyl group having 4 to 12 carbon atoms, and has 6 to 10 carbon atoms.

Specifically, the compound represented by formula (1) includes an alkyl ester of trimellitic acid such as octyl trimellitate, a $C_{7-9}$ alcohol ester of trimellitic acid that is obtained by reaction of trimellitic acid with a mixture of alcohols having 7, 8 and 9 carbon atoms, isononyl trimellitate, isodecyl trimellitate and hexyl trimellitate, although octyl trimellitate is most preferred.

Specifically, the compound represented by formula (2) includes a pyromellitic acid ester such as octyl pyromellitate, a $C_{7-9}$ alcohol ester of pyromellitic acid that is obtained by reaction of pyromellitic acid with a mixture of alcohols having 7, 8 and 9 carbon atoms, isononyl pyromellitate, isodecyl pyromellitate and hexyl pyromellitate, although octyl pyromellitate is most preferred.

These compounds are similar to octyl phthalate, etc. that are less capable of reducing distortion or curling of printed matter, and have little or no effect on holding back the running of ink upon film insert molding. However, the trimellitic acid ester or pyromellitic acid ester has striking effects on holding back the running of ink upon injection molding without any distortion of the printed surface of the decorated sheet after drying or any curling of the decorated sheet, and improves on the adhesion of an injection molded article to the ink printed on a film or sheet. Such effects have gone beyond expectation.

The polycarbonate resin used as the binder for the inventive ink includes a resin that has good heat resistance and is easily soluble in solvents, for instance, a polycarbonate or copolycarbonate that contains the following compounds as the starting material unit, say, 2,2-bis-(4-hydroxy-3-methylphenyl)-propane, 1,1-bis-(4-hydroxyphenyl)-cyclohexane, and 1,1-bis-(4-hydroxyphenyl)-3,3,5-trimethylcyclohexane.

Among others, the polycarbonate or copolycarbonate resin that contains 1,1-bis-(4-hydroxyphenyl)-3,3,5-trimethylcyclohexane as the starting material unit is most preferred.

More specifically, Yupiron FPC-2136 (made by Mitsubishi Gas Chemical Company, Inc.); Panlight TS-2020, Panlight TS-2040 (made by Teijin Limited); and Apec HT2050 (made by Bayer) are usable.

The solvent used for dissolution or dispersion of various components inclusive of the polycarbonate resin as the binder for the inventive ink, for instance, includes an aromatic hydrocarbon, a ketone, an ester, an ether or the like. In consideration of harm removal installations in working environments, however, ester- or (poly)glycol ether-based solvents are preferred.

Specific mention is made of 3-methoxy-3-methy-butyl acetate, propylene glycol monoethyl ether acetate, propylene glycol monomethyl ether acetate, dipropylene glycol methyl ether acetate, diethylene glycol dimethyl ether, triethylene glycol dimethyl ether, tetraethylene glycol dimethyl ether, pentaethylene glycol dimethyl ether, hexaethylene glyccl dimethyl ether, heptaethylene glycol dimethyl ether and octaethylene glycol dimethyl ether.

Among others, it is preferable to use a solvent composed mainly of a mixture of an ester with polyethylene glycol dimethyl ether.

The synthetic resin to be molded integrally with the inventive decorated sheet, for instance, includes a polycarbonate resin, an acrylonitrile-butadiene-styrene copolymer, and a polymer alloy comprising a polycarbonate resin/acrylonitrile-butadiene-styrene copolymer.

The present invention is now explained more specifically with reference to inventive and comparative examples.

EXAMPLE 1

Preparation of Ink 1

Nineteen (19) parts by weight of polycarbonate resin (Apec HT2050 made by Bayer), 15 parts by weight of carbon black, 6 parts by weight of octyl trimellitate and 0.5 part by weight of a defoaming agent were mixed together with 61 parts by weight of a mixed solvent (polyethylene glycol dimethyl ether:propylene glycol monomethyl ether acetate:3-methoxy-3-methyl-1-butanol=10:85:5 by weight), and the mixture was milled with a rotary dispersing machine to obtain an ink 1.

Preparation of Decorated Sheet A

Using ink 1 and a 100-mesh press plate, two oblongs each of 90 mm×50 mm were solid printed by screen printing on a polycarbonate film of 146 mm×160 mm in size and 125 μm in thickness, as shown in FIG. 1.

Printing was carried out in a double-layer form. After the first laver was printed on the film and dried at 80° C. for 6 minutes, the second layer was printed on the first layer and dried at 80° C. for 90 minutes, and then cooled down to room temperature to obtain a decorated sheet A.

Preparation of Decorated Sheet B

Using ink 1, a 280 mm×180 mm oblong was solid printed by screen printing on the middle of a polycarbonate resin film of 300 mm×210 mm in size and 125 μm in thickness under the same conditions as in the case of decorated sheet A.

The thus prepared printed sheet was cut out at the middle in a 65 mm×70 mm oblong form to prepare a decorated sheet B.

Film Insert Molding

The decorated sheet B was placed in an injection mold 1 a section of which is shown in FIG. 2(A), with the printed layer surface of a decorated sheet 2 located on the gate 3 side of an injection nozzle. Polycarbonate resin (Panlight L1225L made by Teijin Limited) was injected through an injection molding machine with a cylinder temperature set at 300° C., wherein the gate 3 for a 1 mm diameter injection nozzle was located a 2 mm away from the printed surface of the decorated sheet to prepare an insert molded sample. Then, the amount of running of ink was estimated by the following estimation method, and the adhesion strength of the decorated sheet B to the synthetic resin molded product was estimated by the following peeling strength test method.

Estimation Methods

1. Estimation of Curling Resistance

Decorated sheet A was placed on a flat plate. A sample whose end was slightly curled was ranked as very excellent, a sample whose end was crescently or arcuately curved as excellent, a sample whose end was U-shaped as good, and a sample whose end was C-shaped or cylindrically curled as bad.

2. Measurement of the Amount of Running of Ink

Such a film insert molded article 4 as shown in a plan view of FIG. 2(B) was provided. Diameters r1 and r2 of exposed underlying portions 6 of a printed area 5 caused by the running of ink were measured, and their average value is indicated as the amount of running of ink in Table 1.

It is noted that the film insert molding conditions applied hereto were set for estimation of the amount of running of ink, and so were much severer than those applied practically in the art.

3. Measurement of Adhesion Strength

A 1 cm wide incision was provided in a decorated sheet of an injection molded sample, and an injection molded resin was peeled from that incision at a tensile rate of 300 mm/min. to measure 180° peeling strength using a tensile testing machine. The result is shown in Table 1.

EXAMPLE 2

Preparation and Estimation of Ink 2

An ink 2 was prepared as in Example 1 with the exception that 6 parts by weight of an alcohol ester of trimellitic acid were used in place of 6 parts by weight of octyl trimellitate, and measured for curling resistance, the amount of running of ink and peeling strength, as in Example 1. The results are indicated in Table 1.

EXAMPLE 3

Preparation and Estimation of Ink 3

An ink 3 was prepared as in Example 1 with the exception that 6 parts by weight of octyl pyromellitate were used in place of 6 parts by weight of octyl trimellitate, and measured for curling resistance, the amount of running of ink and peeling strength, as in Example 1. The results are indicated in Table 1.

COMPARATIVE EXAMPLE 1

Preparation and Estimation of Ink 4

An ink 4 was prepared as in Example 1 with the exception that dioctyl phthalate was used in place of 6 parts by weight of octyl trimellitate, and measured for curling resistance, the amount of running of ink and peeling strength, as in Example 1. The results are indicated in Table 1.

COMPARATIVE EXAMPLE 2

Preparation and Estimation of Ink 5

An ink 5 was prepared by milling together 20 parts by weight of polycarbonate resin (Yupiron FPC-2136 made by Mitsubishi Gas Chemical Company, Ltd.), 18 parts by weight of polysiloxane (SILRES SY-430 made by Asahi Chemical Wacker-Silicon Co., Ltd.), 10 parts by weight of carbon black, 1 part by weight of a defoaming agent, 20 parts by weight of a solvent cyclohexanone, 20 parts by weight of a solvent propylene glycol monomethyl ether acetate and 10 parts by weight of a hydrocarbon solvent (Solveso #150).

Ink 5 was measured for curling resistance, the amount of running of ink and peeling strength as in Example 1. The results are indicated in Table 1.

COMPARATIVE EXAMPLE 3

An ink 6 was prepared as in Example 1 with the exception that 6 parts by weight of octyl trimellitate were not used, and measured for curling resistance, the amount of running of ink and peeling strength as in Example 1. The results are indicated in Table 1.

TABLE 1

| | Curling Resistance | Amount of Running of Ink (mm) | Peeling Strength (kN/m) |
|---|---|---|---|
| Ex. 1 | Very Excellent | 3.6 | 1.41 |
| Ex. 2 | Very Excellent | 4.5 | 1.42 |
| Ex. 3 | Very Excellent | 3.7 | 1.65 |
| Comp. Ex. 1 | Excellent | 8.6 | 1.13 |
| Comp. Ex. 2 | Very Excellent | 12.8 | 1.12 |
| Comp. Ex. 3 | Good | 8.6 | 1.19 |

With the decorated sheet prepared using the inventive printing ink, high-precision printing becomes possible even with a thin substrate film, because the amount of curling can be reduced with an improvement in the workability at a printing step. When the decorated sheet is used with film insert molding, the amount of running of ink due to injected synthetic resin can be so reduced that the degree of freedom in mold design can be increased, making a great deal of contribution to film insert molding.

What we claim is:

1. A heat-resistant printing ink, which comprises a compound having the following formula (1) or (2) together with a polycarbonate resin binder and a solvent therefor:

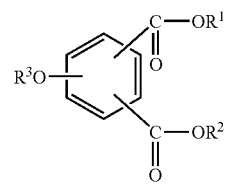

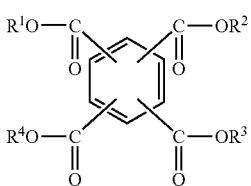

where $R^1$, $R^2$, $R^3$ and $R^4$ may be identical with or different from one another, each representing a hydrocarbon residue.

2. The printing ink according to claim 1, wherein the hydrocarbon residue is an alkyl group having 4 to 12 carbon atoms.

3. The printing ink according to claim 1, wherein the polycarbonate resin is a thermoplastic aromatic polycarbonate including a difunctional polycarbonate structure unit, represented by the following formula (3):

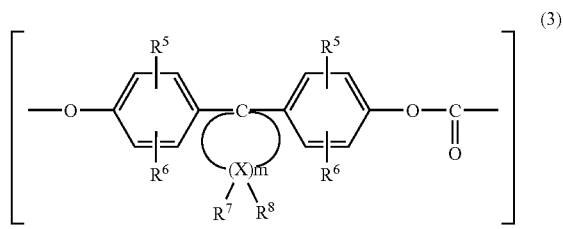

where $R^5$ and $R^6$ are each independently a hydrogen atom, a halogen atom, an alkyl having 1 to 8 carbon atoms, a cycloakyl having 5 or 6 carbon atoms or an arylalkyl having 6 to 10 carbon atoms, m is an integer of 4 to 7, $R^7$ and $R^8$ are selected for each X and are each independently a hydrogen atom or an alkyl group having 1 to 6 carbon atoms, and X is a carbon atom, wherein with at least one atom X, $R^7$ and $R^8$ are both an alkyl group.

4. The printing ink according to claim 2, wherein the polycarbonate resin is a thermoplastic aromatic polycarbonate including a difunctional polycarbonate structure unit, represented by the following formula (3):

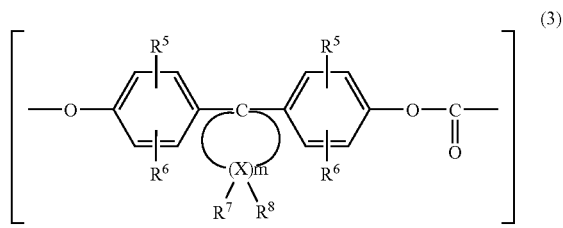

where $R^5$ and $R^6$ are each independently a hydrogen atom, a halogen atom, an alkyl having 1 to 8 carbon atoms, a cycloalkyl having 5 or 6 carbon atoms or an arylalkyl having 6 to 10 carbon atoms, m is an integer of 4 to 7, $R^7$ and $R^8$ are selected for each X and are each independently a hydrogen atom or an alkyl group having 1 to 6 carbon atoms, and X is a carbon atom, wherein with at least one atom X, $R^7$ and $R^8$ are both an alkyl group.

5. The printing ink according to claim 3, wherein the polycarbonate resin is a thermoplastic aromatic polycarbonate including a difunctional polycarbonate structure unit, represented by the following formula (4):

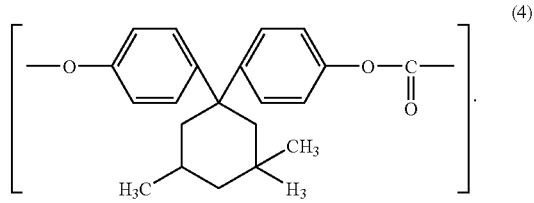
(4)

6. The printing ink according to claim 4, wherein the polycarbonate resin is a thermoplastic aromatic polycarbonate including a difunctional polycarbonate structure unit, represented by the following formula (4):

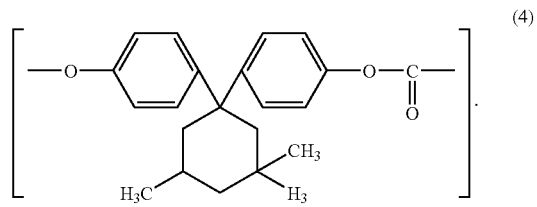
(4)

7. An ink-decorated sheet, wherein a thermoplastic resin film or sheet has on at least one surface at least one printed layer that is formed using the ink according to claim 1.

8. A synthetic resin-molded article, wherein a thermoplastic synthetic resin is molded integrally with the decorated sheet according to claim 7.

9. The synthetic resin-molded article according to claim 8, which is formed by film insert molding.

* * * * *